UNITED STATES PATENT OFFICE.

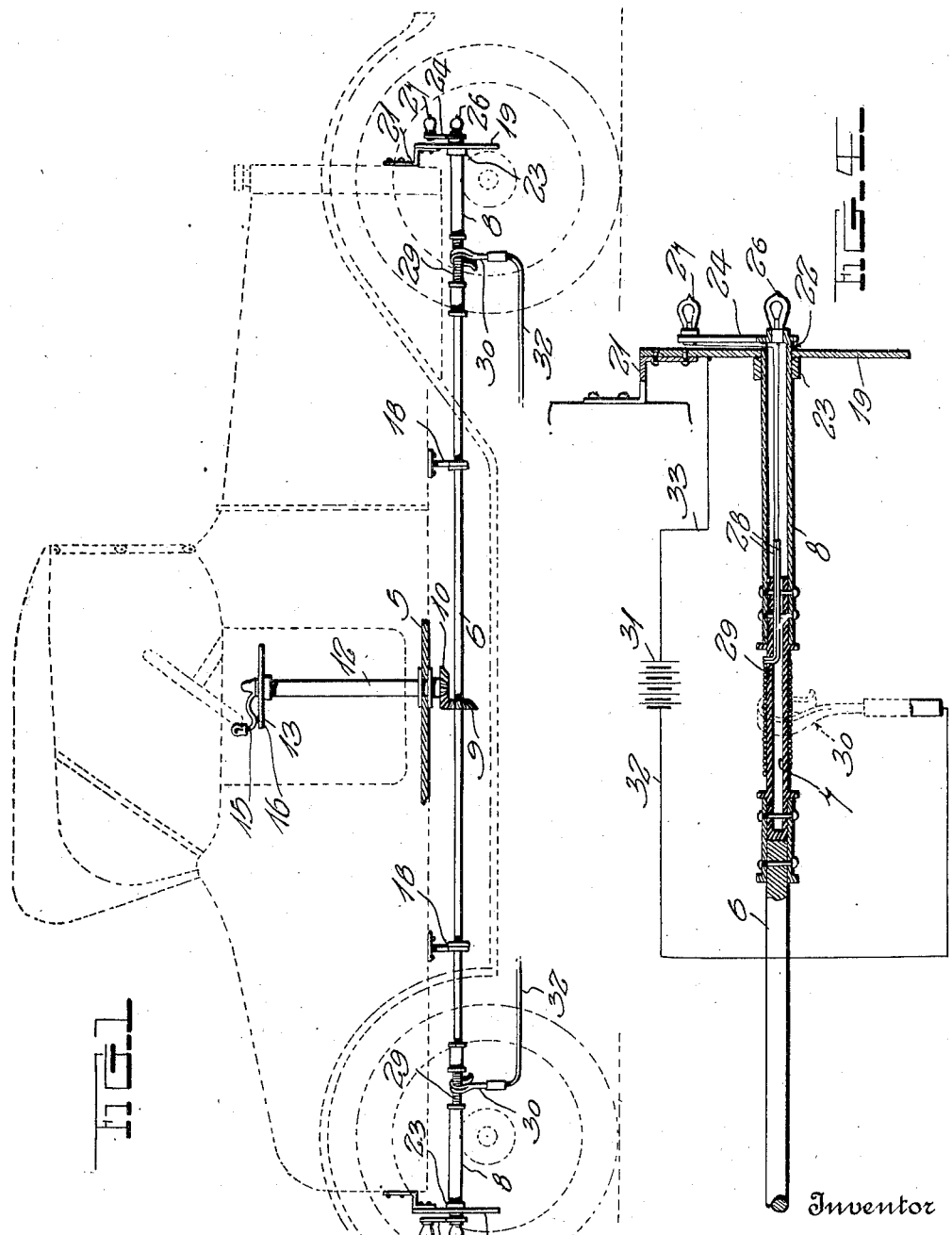

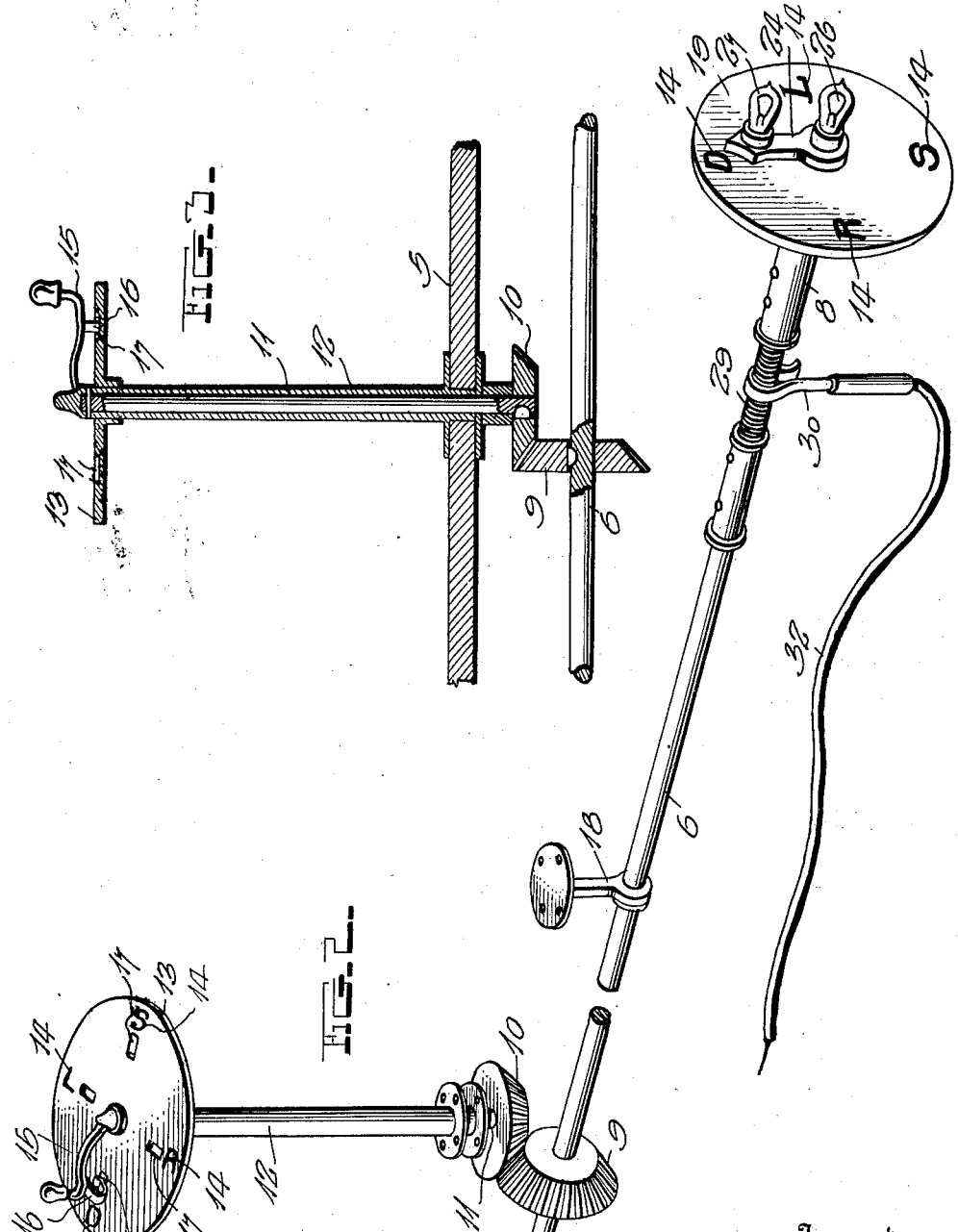

DOMENICO MERENDINO, OF NEW ORLEANS, LOUISIANA.

CONNECTOR FOR VEHICLE DIRECTION-INDICATORS.

1,362,170.  Specification of Letters Patent.  Patented Dec. 14, 1920.

Application filed April 28, 1919. Serial No. 293,065.

*To all whom it may concern:*

Be it known that I, DOMENICO MERENDINO, a citizen of the United States, residing at New Orleans, in the parish of Orleans and State of Louisiana, have invented certain new and useful Improvements in Connectors for Vehicle Direction-Indicators; and do declare the following to be a full, clear, and exact description of the invention, such as will enable others skilled in the art to which it appertains to make and use the same.

This invention relates to vehicle direction indicators.

One object of this invention is to provide an improved means for indicating, to persons in front and rear of a vehicle, the intention of the driver concerning the direction to be pursued by the vehicle, and for indicating when the vehicle is to be stopped.

Other objects and advantages may become apparent to persons who read the following details of description in connection with the accompanying drawings, in which:

Figure 1 is a side elevation of my improved direction indicator, applied to an automobile, the latter being illustrated partly in section and partly in broken lines;

Fig. 2 is a perspective view illustrating the front indicating plate and pointer together with other adjuncts and the mechanism whereby the pointer is operated;

Fig. 3 is a vertical sectional view of a portion of the device;

Fig. 4 is a vertical sectional view of another portion of the device, this view showing the vertical connections somewhat diagrammatically.

Referring to these drawings in detail, in which similar reference characters correspond with similar parts throughout the several views, the element 5 in Figs. 1 and 3 represents a part of the floor of an automobile, the remainder of the automobile, exclusive of my improved direction indicator, not being described in detail.

My invention comprises a shaft 6, the same including an insulating section 7 and a hollow metal section 8. In fact, this shaft may be considered as including two of the sections 7 and two of the sections 8, the front and rear ends of the shaft being similar to one another. A gear wheel 9 is mounted on the shaft 6 and meshes with a gear wheel 10 which is mounted on a shaft 11, the latter being journaled in a tubular standard 12 which extends through an aperture in the floor 5 and is rigidly secured to the floor. At the upper end of the tube 12 is mounted a plate or disk 13 which is provided with words or initials 14 to indicate any direction the driver is about to go, or whether the driver is about to stop the vehicle. On the upper end of the shaft 11 is mounted a crank or handle 15 by means of which the shaft 6 may be turned through the medium of the transmission elements 9, 10 and 11. A spring detent 16 may be carried by the crank 15, and this detent may engage with notches 17, in the disk 13, to retain the handle and the mechanism actuated thereby in either of the indicating positions.

Appropriate bearings 18 may be provided to support the rotary shaft 6, and this shaft may be additionally supported by means of the front and rear indicator plates or disks 19 and 20, through the medium of brackets 21, it being understood that the hollow portions 8 extend through central apertures 22 in the front and rear disks, and collars 23 are provided on the shaft sections 8 to prevent longitudinal movement of the shaft.

On the front and rear sections 8 of the shaft are secured the front and rear pointers 24 and 25, and these pointers turn with the shaft 6 into the different indicating positions, that is, into position for indicating whether the vehicle is to proceed directly forward, toward the right, toward the left, or to stop, it being understood that the disks 19 and 20 are provided with words or initials 14 to correspond with the words or initials 14 on the disk or indicating plate 13.

Electric lights 26 and 27 are carried respectively at the inner and outer ends of each pointer 24 and 25, and each of these electric lights has one terminal grounded or electrically connected to the pointer which carries it, its other terminal being connected to a conducting wire 28 which extends through the adjacent tubular section 8 and thence into and through an aperture of the insulating section 7 and terminates in a coil 29 which surrounds the insulating element 7 and forms a substantially cylindrical contact element which is embraced by a hook 30 of spring metal. The hook 30 is electrically connected with a source of electric current 31 through the medium of a conducting wire 32, and this current source 31 is electrically connected to one or both of the disks 19 and 20 through the medium of one or more conducting wires or terminals 33. In other words, although I have shown a battery 31 in connection with only the front indicating plate and its adjuncts, I may also connect the rear indicator disk and its adjuncts to the same battery, or I may employ separate batteries, for the front and rear indicators, as may be desirable.

In operating the device, the shaft 6 is turned, as previously described, and this rotates the pointers 24 and 25 toward the right or left, according to whether the vehicle is to turn rightward or leftward, or I may turn the pointer downward to indicate that the vehicle is to stop, it being understood that the pointers 24 and 25 normally point upward to the word or initial which indicates the intention of moving directly forward. During the rotation of the shaft 6, the hook 30 depends from the coil 29 as illustrated in Figs. 1, 2 and 4, and the electric current flows from the coil 29 through the hook 30 and wire 32 to the battery, or vice versa, and also flows through the wires 28, the lights 26 and 27, the pointers 24 and 25, the indicating plates 19 and 20, and the conductor wire 33.

It will be seen, therefore, that the electric lights 26 remain substantially stationary, while the lights 27 revolve about the lights 26. The lights 26 are preferably white, and the lights 27 are preferably red or of some other appropriate color, and the position of the colored lights with respect to the white lights indicates the direction about to be pursued even if the indicating words or initials are not clearly visible to the observer. However, in order that the best effect may be obtained, the indicator plates 19 and 20 are preferably white while the letters may be of any appropriate color which gives the best effect in connection with the color of the lights 27.

Although I have described this embodiment of my invention very specifically, it is not intended to limit this invention to these exact details of construction and arrangement of parts, but I am entitled to make changes within the scope of the invention idea disclosed in the foregoing description and the following claim.

What I claim as my invention is:

The combination of a hollow rotary shaft including a conducting portion and a non-conducting portion, a conducting wire extending longitudinally through the conducting portion of the shaft and laterally from the interior of said non-conducting portion and forming parallel coils around the latter, and a conducting spring hook adapted to be detachably connected to said coils by loosely embracing the coils and thereby making electrical connection with said wire while the shaft rotates.

In testimony whereof I have hereunto set my hand.

DOMENICO MERENDINO.